United States Patent Office 3,535,253
Patented Oct. 20, 1970

3,535,253
PHENOLIC RESINS RENDERED FIRE RETARDANT BY THE ADDITION OF HALOGENATED-CYCLO-PENTADIENE ADDUCTS
Raymond R. Hindersinn, Lewiston, N.Y., and John F. Porter, Durham, N.C., assignors to Hooker Chemical Corporation, Niagara Falls, N.Y., a corporation of New York
No Drawing. Continuation-in-part of application Ser. No. 625,594, Mar. 24, 1967, which is a continuation-in-part of application Ser. No. 390,220, Aug. 17, 1964. This application July 11, 1968, Ser. No. 743,931
The portion of the term of the patent subsequent to Sept. 24, 1985, has been disclaimed
Int. Cl. C08f 45/30; C08k 1/24
U.S. Cl. 260—38                                    10 Claims

ABSTRACT OF THE DISCLOSURE

Phenolic resins and molding compounds are rendered fire retardant by incorporating therein a Diels-Alder adduct of a halogenated cyclopentadiene and a polyunsaturated cycloaliphatic compound. Typical compounds include the adducts of hexachlorocyclopentadiene with 1,5-cyclooctadiene, dicyclopentadiene, cyclopentadiene, and the like. The fire retardance of the compositions can be further enhanced by the incorporation therein of a metallic compound, particularly a compound of antimony, arsenic or bismuth. A preferred metallic compound is antimony oxide.

CROSS REFERENCE TO PRIOR APPLICATION

This is a continuation-in-part of copending application Ser. No. 625,594, filed Mar. 24, 1967, now Pat. No. 3,403,036; which was filed as a continuation-in-part of application Ser. No. 390,220, filed Aug. 17, 1964, now abandoned.

This invention relates to constant or nonmigrating fire retardants for otherwise combustible organic compositions.

The use of organic compositions, particularly those grouped together in the broad class of polymeric materials and coatings, is expanding each year. These materials find wide application as wire coatings, pipes, conduits and other industrial moldings and extruded products, as well as in paints, films, coatings, and miscellaneous products. These and other uses are better served by polymeric compositions and coatings that are fire retardant or flame resistant. Many prior art attempts to impart fire retardance to such compositions by the use of additives have adversely affected the desirable properties of the polymer or coating, due to the high proportions of fire retardant additive often required to be used to achieve an adequate level of fire retardancy. In addition, prior products have often been adversely affected, due to the migratory properties and sensitivity to environmental conditions of the fire retardant additives used.

Accordingly, it is an object of this invention to provide fire retardant polymer compositions and coatings. Additionally, it is an object of this invention to provide such polymer compositions containing additives that not only impart constant fire resistance but also enhance or preserve other physical properties of the protected composition.

It has now been found that Diels Alder adducts of halogenated cyclopentadiene, hereinafter more fully defined, having a melting point above 250 degrees centigrade, a vapor pressure of less than 0.10 millimeter of mercury at 197 degrees centigrade and a halogen content of at least 40 percent when admixed with a polymeric composition imparts to the polymeric composition an extremely constant fire retardancy.

In accordance with this invention there is provided a fire retardant polymeric composition wherein the constant fire retarding agent is a compound of the formula

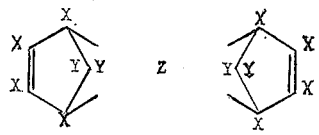

wherein X is selected from the group consisting of bromine, chlorine and fluorine, Y is selected from the group consisting of bromine, chlorine, fluorine, alkyl and alkoxy, Z is a tetravalent cyclic hydrocarbon having at least 5 carbon atoms, Z may be substituted by lower alkyl of 1 to 6 carbon atoms, chlorine, bromine or fluorine. The alkyl and alkoxy radicals mentioned generally have 1 to 10 carbon atoms and preferably are of 1 to * carbon atoms. Z is a cyclic hydrocarbon of 5 to 18 carbon atoms and from 1 to 5 cyclic structures. When Z is a plurality of cyclic structures, they are fused, that is, share carbon atoms.

Such a compound may be made by adducting (Diels Alder reaction) one mole of a polyunsaturated cycloaliphatic compound and two or more moles of a polyhalogenated cyclopentadiene of the formula

X and Y have the same definitions as previously stated. The polyunsaturated cycloaliphatic compound mentioned above contains 5 to 18 carbon atoms, has 1 to 5 cyclic structures and when more than one the cyclic structures, are fused and at least two sites of carbon to carbon unsaturation which may be either ethylenic or acetylenic.

Illustrative of the polynalogenated cyclopentadienes suitable for use in this invention are hexachlorocyclopentadiene, 5,5 - dimethoxytetrachlorocyclopentadiene, hexabromocyclopentadiene, 5,5 - difluorotetrachlorocyclopentadiene, 5,5-dibromotetrachlorocyclopentadiene and 5,5-diethoxytetrachlorocyclopentadiene.

Satisfactory polyunsaturated aliphatic compounds for use in preparing the Diels Alder adduct with

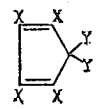

include cycloaliphatic compounds exemplified by but not limited to methyl cyclopentadiene, cyclopentadiene, dicyclopentadiene, bicyclo(2.2.1) heptadiene, 1,5 - cyclo-octadiene, cyclodecadiene and cyclododecadiene.

The preparation of 1,4,7,10 - dimethanocycloocta-1,2,3,4,7,8,9,10,13,13,14,14 - dodecachloro - 1,4,4a,5,6,6a,7,10,10a,11,12,12a-dodecahydro[1,2,5,6]dibenzene is disclosed by Ziegler and Froitzheim-Kuhlhorn, Annalen, vol. 589, page 157 (1954). This compound's structure is believed to be

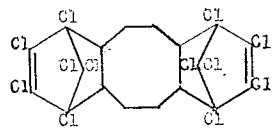

For convenience this compound will be referred to by the short title of 1,5 COD. The adduct is prepared by condensing two moles of hexachlorcyclopentadiene with one mole of 1,5-cyclooctadiene in xylene at a temperature below 200 degrees centigrade. The adduct melts at above 350 degrees centigrade and has a vapor pressure of 0.006 millimeter of mercury at 197 degrees centigrade.

In a similar manner 1,2,3,4,5,6,7,8,9,13,13,14,14-dodecachloro - 1,4:5,10:6,9-trimethano-11 H-benzo[b]fluorene is prepared by condensing two moles of hexachlorocyclopentadiene with one mole of dicyclopentadiene. The adduct has the assigned structure:

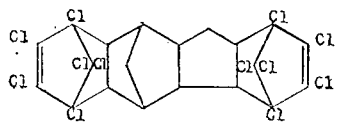

For convenience this compound will be referred to as DCP. DCP melts at about 277 degrees centigrade to 278 degrees centigrade and has a vapor pressure of 0.044 millimeter of mercury at 197 degrees centigrade.

Likewise 1,2,3,4,5,6,7,8,10,10,11,11 - dodecachloro-1,4:5,8-dimethanofluorene is prepared by condensing two moles of hexachlorocyclopentadiene with one mole of cyclopentadiene. This adduct has the assigned structure

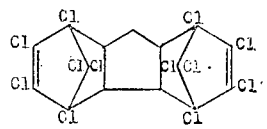

For convenience this adduct will be referred to as CP. CP melts at about 319 degrees centigrade to 322 degrees centigrade and has a vapor pressure of 0.031 millimeter of mercury at 197 degrees centigrade.

The adduct 1,2,3,4,5,6,7,8,12,12,13,13 - dodecachloro-1,4:5,8:9,10-trimethano-anthracene is prepared by condensing one mole of the Diels Alder adduct of cyclopentadiene and acetylene with two moles of hexachlorocyclopentadiene. The resulting adduct has the assigned structure:

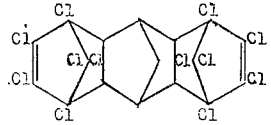

For convenience this adduct will be referred to as BCH. BCH melts at about 340 degrees centigrade and has a vapor pressure of 0.008 millimeter of mercury at 197 degrees centigrade.

The fire retardant additives of this invention remain in the protected polymeric composition even after prolonged exposure of the plastic article to high temperatures. The polymeric compositions of this invention include the phenol-aldehyde condensation reaction products, preferably the phenol-formaldehyde novolac resins. The aldehyde component can also be a higher aldehyde of 2 to 8 carbon atoms, e.g., acetaldehyde, propionaldehyde, crotonaldehyde, 2-ethylhexaldehyde, and the like. The novolac resins are conveniently cured with hexamethylenetetramine when used to form molded articles.

The halogenated Diels-Alder adducts in the present compositions are desirably incorporated in the polymeric materials in an effective fire retardant amount. Generally, halogenated Diels-Alder adducts in the amount of from about 2 to about 50 percent by weight of the polymeric composition and desirably from about 5 to about 40 percent by weight of the polymeric composition and preferably from about 10 to 35 percent by weight are mixed with polymeric composition. Improved fire retardance can be provided by incorporating metallic compounds, wherein the metal is selected from the group consisting of antimony, arsenic and bismuth, in the polymeric compositions in the amount of about 1 to about 30 percent by weight of said polymeric composition, preferably about 2 to 25 percent.

Antimony oxide is the antimony compound that is presently preferred for use in the present invention. However, many antimony compounds are suitable. Suitable antimony compounds include the sulfides of antimony, salts of the alkali metals of Group I of the Periodic Table, antimony salts of organic acids and their pentavalent derivatives and the esters of antimonous acids and their pentavalent derivatives. It is convenient to use sodium antimonite or potassium antimonite when it is desired to use an alkali metal salt of the antimony for compositions of this invention. U.S. Pat. 2,996,528, discloses suitable antimony salts of organic acids and their pentavalent derivatives. Compounds of this class include antimony butyrate, antimony valerate, antimony caproate, antimony heptylate, antimony caprylate, antimony perlargonate, antimony caprate, antimony cinnamate, antimony anisate, and their pentavalent dihalide derivatives. Likewise, the esters of antimonous acids and their pentavalent derivatives disclosed in U.S. Pat. 2,993,924 such as tris(n-octyl) antimonite, tris(2-ethylhexyl) antimonite, tribenzyl antimonite, tris(beta-chloroethyl) antimonite, tris(beta-chloropropyl) antimonite, tris(beta-chlorobutyl) antimonite, and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed in particular the oxides of arsenic and bismuth.

The components comprising the compositions of the instant invention can be mixed by any one of several methods. The additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Also, the additives can be mixed with the polymer in the molten state at temperatures that can range from the melting point to the decomposition of the polymer, e.g., from 70 to 600 degrees centigrate. Alternatively, the additives and polymer can be dry blended in the finely divided state so that an intimate mixture is obtained upon subsequent molding.

The invention is illustrated by the following examples, which are not intended to limit the scope of the invention. Unless otherwise stated in this specification and claims, all parts are by weight and all temperatures are in degrees centigrade.

EXAMPLE I 360 parts by weight of the adduct 1,5-COD were intimately mixed with about 3000 parts by weight of a phenolic molding compound comprised of about equal parts of (1) a two-stage, phenol-formaldehyde novolac resin and hexamethylene tetramine, and (2) an asbestos mineral filler, by the following procedure. The novolac resin and hexamethylene tetramine, in pulverized form, were intimately mixed in a ball mill with the fillers and 1,5-COD. The resulting mixture was added to a hot roll mill to densify the material into sheet form, which was cooled and pulverized. The resulting composition was subjected to testing for physical properties and fire retardance, the results of which are shown in Table I.

TABLE I

| Example Nos. | 1 | 2 |
|---|---|---|
| Flexural strength, p.s.i. | 9,300 | 12,200 |
| Izod impact strength, ft.-lb./inch | 0.34 | 0.29 |
| Compression shrinkage, inches/inch | 0.0033 | 0.0065 |
| ASTM cup plasticity, seconds: | | |
| 3,600 p.s.i. | 28.2 | 23.0 |
| 5,000 p.s.i. | 22.0 | 18.6 |
| 7,500 p.s.i. | 16.4 | 11.8 |
| 10,000 p.s.i. | 12.8 | 10.6 |
| Underwriter's Laboratory flammability test method No. 1 [1] | Passed | Passed |

[1] U.L. bulletin No. 384 (1959).

EXAMPLE 2

The procedure of Example 1 was repeated except that one-half of the mineral filler employed with novolac resin was replaced with a wood flour filler. The resulting composition was tested for physical properties and fire retardancy, the results of which are shown in Table I.

EXAMPLE 3

The adduct 1,5-COD and antimony trioxide were used to fire retard a phenolic resin and the properties of the compositions were compared with the phenolic resin composition containing neither of these additives. The proportions of phenol-formaldehyde and hexamethylene tetramine, mineral fillers and fire retardant additives are shown in Table II. The powdered components were intimately mixed in a ball mill and then densified on a pair of hot rolls to a sheet of material which was cooled and pulverized. A portion of the resulting moldable composition was molded into test specimens for the determination of physical properties and fire retardancy, the results of which tests are also shown in Table II.

TABLE II

| | Example No. | | |
|---|---|---|---|
| | 3 | 4 | 5 |
| Components, parts by weight: | | | |
| Phenol-formaldehyde novolac and hexamethylenetetramine | 1,300 | 1,300 | 1,300 |
| Asbestos mineral filler | 2,300 | 2,160 | 2,260 |
| 1,5-COD | 0 | 185 | 370 |
| Antimony trioxide | 0 | 61 | 123 |
| Properties: | | | |
| Flexural strength, p.s.i. | 14,850 | 11,700 | |
| Izod impact strength, p.s.i. | 0.314 | 0.317 | |
| Heat distortion point, °F | 355.1 | 346.1 | |
| ASTM cup plasticity, seconds: | | | |
| 5,000 p.s.i. | 15.4 | 19.2 | |
| 7,500 p.s.i. | 12.0 | 13.4 | 18.0 |
| 10,000 p.s.i. | 9.0 | 9.6 | 14.2 |
| Underwriter's Laboratory flammability test method No. 2 [1] | Failed | Passed | Passed |

[1] U.L. bulletin No. 484 (1959). (Modified by holding test bar in flame 10 seconds out of flame 5 seconds for 5 cycles. To pass, specimen must extinguish in 5 seconds after 5 cycles.)

From the examples, it is evident that the incorporation of the fire retardant compounds of this invention into phenol-aldehyde resins and molding compounds imparts fire retardance to the polymer. The fire retardant characteristics of the compositions are further enhanced by also incorporating a metallic compound, such as an antimony compound therein.

Various changes and modifications can be made in the compositions of the invention, certain preferred forms of which have been described herein, without departing from the spirit and scope of the invention.

We claim:

1. A fire retardant polymeric composition comprising a phenolaldehyde resin and an effective fire retardant proportion of a compound of the formula

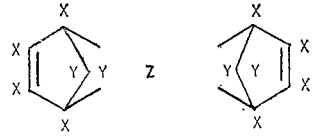

wherein X is selected from the group consisting of bromine, chlorine, and fluorine, Y is selected from the group consisting of bromine, chlorine, fluorine, alkyl and alkoxy, and Z is a tetravalent cycloaliphatic hydrocarbon radical having at least 5 carbon atoms.

2. The composition of claim 1 wherein the compound of the formula is 1,4,7,10-dimethanocycloocta-1,2,3,4,7,8,9,10,13,13,14,14 - dodecachloro - 1,4,4a,5,6,6a,7,10,10a,11,12,12a-dodecahydro[1,2,5,6]dibenzene.

3. The composition of claim 1 wherein the compound of the formula is present in sufficient proportion, up to about 50 weight percent of the polymer composition, to improve the fire retardance of the polymer composition.

4. A molded article of the composition of claim 1.

5. The composition of claim 1 wherein the phenolaldehyde resin is a phenol-formaldehyde novolac resin.

6. The composition of claim 1 having incorporated therein a metallic compound wherein the metal is selected from the group consisting of antimony, arsenic and bismuth.

7. The composition of claim 6 wherein the compound of the formula is present in a proportion from 2 to 50 percent by weight of the polymer composition, and the metallic compound is an antimony compound present in a proportion from 1 to 30 percent by weight of the polymer composition.

8. The composition of claim 7 wherein the antimony compound is antimony oxide.

9. The composition of claim 8 wherein the phenolaldehyde resin is a phenol-formaldehyde novolac resin.

10. The composition of claim 9 wherein the compound of the formula is 1,4,7,10-dimethanocycloocta-1,2,3,4,7,8,9,10,13,13,14,14 - dodecachloro - 1,4,4a,5,6,6a,7,10,10a,11,12,12a-dodecahydro[1,2,5,6]dibenzene.

References Cited

UNITED STATES PATENTS

| 2,576,666 | 11/1951 | Bluestone et al. | |
| 2,606,910 | 8/1952 | Herzfeld et al. | |
| 2,635,977 | 4/1953 | Lidov. | |
| 2,951,099 | 8/1960 | Hoch. | |
| 2,967,842 | 11/1961 | Roberts. | |
| 3,158,588 | 11/1964 | Johnson | 260—45.75 |
| 3,382,204 | 5/1968 | Gouinlock | 260—33.8 |

MORRIS LIEBMAN, Primary Examiner

S. M. PERSON, Assistant Examiner

U.S. Cl. X.R.

260—45.75